(12) United States Patent
Hashimoto et al.

(10) Patent No.: US 6,834,493 B2
(45) Date of Patent: Dec. 28, 2004

(54) SYSTEM FOR REDUCING PUMP CAVITATION

(75) Inventors: Tomoyuki Hashimoto, Kakuda (JP); Mitsuo Watanabe, Kakuda (JP); Takeshi Kanda, Kakuda (JP); Satoshi Hasegawa, Kakuda (JP); Kenji Kudo, Kakuda (JP); Athuo Murakami, Kakuda (JP); Kouichiro Tani, Kakuda (JP)

(73) Assignee: National Aerospace Laboratory of Japan, Tokyo (JP)

( * ) Notice: Subject to any disclaimer, the term of this patent is extended or adjusted under 35 U.S.C. 154(b) by 0 days.

(21) Appl. No.: 10/196,055

(22) Filed: Jul. 17, 2002

(65) Prior Publication Data

US 2003/0014965 A1 Jan. 23, 2003

(30) Foreign Application Priority Data

Jul. 19, 2001 (JP) .................................... 2001-220020

(51) Int. Cl.⁷ .............................................. F02K 9/46
(52) U.S. Cl. .......................................... 60/204; 60/259
(58) Field of Search ............................ 60/257, 258, 259, 60/260, 205, 204

(56) References Cited

U.S. PATENT DOCUMENTS

| | | | | |
|---|---|---|---|---|
| 3,597,923 A | * | 8/1971 | Simon | 60/260 |
| 3,601,993 A | * | 8/1971 | Bringer | 60/240 |
| 3,756,024 A | * | 9/1973 | Gay | 60/204 |
| 3,775,977 A | * | 12/1973 | Builder et al. | 60/260 |
| 4,856,284 A | * | 8/1989 | Mattiola et al. | 62/50.7 |
| 4,881,375 A | * | 11/1989 | Mattiola et al. | 62/50.6 |
| 5,025,623 A | * | 6/1991 | Hirakoso et al. | 60/257 |
| 5,214,925 A | * | 6/1993 | Hoy et al. | 62/50.6 |
| 5,248,245 A | * | 9/1993 | Behnke et al. | 417/366 |
| 6,584,784 B2 | * | 7/2003 | Gaul | 62/113 |
| 6,607,361 B1 | * | 8/2003 | Kotter et al. | 417/53 |
| 2001/0015063 A1 | * | 8/2001 | Maeding | 60/258 |

OTHER PUBLICATIONS

Arthur Palisoc, et al., Solar Engineering– vol. 2., ASME 1995, pp. 855–864.
Dean M. Lester et al., American Institute of Aeronautics and Astronautics, Space 2000–5109 Conference and Exposition pp. 1–10.
Paul A. Gierow, et al., Journal of Spacecraft and Rockets, vol. 32, No. 4, Jul.–Aug. 1995, pp. 697–702.
George P. Sutton, Elements the Engineering of Rockets, John Wiley & Sons (1986), pp. 151–157.
Dieter K. Huzel et al., The American Institute of Aeronautics and Astronautics, vol. 47, (1992) pp. 33–38 and pp. 160–162.
Mitsuo Watanabe, et al., Pump System for Cavitation Suppression with a Cooler (Date Not Known).
Michael A. Dornheim, Aviation Week & Space Technology, Mar. 30, 1998, pp. 76–77.

* cited by examiner

*Primary Examiner*—Ehud Gartenberg
(74) *Attorney, Agent, or Firm*—Westerman, Hattori, Daniels & Adrian, LLP

(57) ABSTRACT

Cavitation is reduced in a rotary pump while the pump performance is maintained by utilizing a low-temperature fluid source already present in the pump system. The fluid from the low-temperature fluid source receives heat from the fluid flowing to the pump, thereby lowering its temperature and the saturated vapor pressure, which increases the allowable margin for a decrease in fluid pressure and reduces the occurrence of cavitation. The pump system may be used for a liquid rocket engine. The fluid velocity of the fluid directed to the pump is low before releasing heat, so there is only a slight pressure loss at the pump. Accordingly, the temperature is lowered and the occurrence of cavitation is reduced within the pump.

8 Claims, 5 Drawing Sheets

SYSTEM FOR REDUCING PUMP CAVITATION

BACKGROUND OF THE INVENTION

1. Field of the Invention

The present invention relates to a technique for reducing cavitation in a system having a low-temperature heat source, and more particularly relates to a system for reducing pump cavitation with which cavitation is reduced very well in a rotary pump used for the supply of a propellant to a rocket engine.

2. Description of the Related Art

At the inlet to a rotary pump, there is a decrease in pressure behind the blades rotating at high speed, and in some cases bubbles can form when the pressure drops below the saturated vapor pressure-locally. This is called cavitation. When cavitation does occur, there is a decrease in the pump intake flux or pump outlet pressure, and at the same time the vibration of the pump may increase to the point that the pump breaks.

Some of the measures that have been taken in the past for avoiding the occurrence of this cavitation include the following.

1. Raising the pump inlet pressure
2. Reducing the pump speed so as to minimize the pressure drop at the pump inlet
3. Decreasing the outside diameter of the pump inlet In order to increase the payload of a rocket, the overall size and weight of the rocket engine need to be reduced, including reducing the size and weight of the pump system that supplies propellant to the engine. To accomplish this, it is necessary to raise the pump speed so as to increase the attainable pump pressure and also increase the operating pressure of the rocket engine. However, while measures 1 to 3 above do indeed reduce cavitation, they also diminish pump performance so much that the desired high performance cannot be achieved, so the above-mentioned necessity cannot be met. Specifically, with measure 1, the pressure must be raised in the propellant tank, which requires a corresponding increase in the thickness of the tank walls, and this results in greater tank weight. With measures 2 and 3, pump performance is diminished, the operating pressure of the rocket engine cannot be raised, and the specific thrust cannot be increased, among other problems.

The present invention was conceived in light of this situation, and it is an object thereof to reduce the occurrence of cavitation by means of a simple structure, while maintaining pump performance, in a rotary pump (if the pump has an inducer, this refers to the entire pump including the inducer), and to lower the overall weight and size of a rocket engine by improving the propellant supply system of the engine.

SUMMARY OF THE INVENTION

The present invention is a pump system in which the temperature of the fluid flowing to the pump is lowered so as to lower the saturated vapor pressure of this fluid, which increases the allowable decrease in fluid pressure and reduces the occurrence of cavitation.

The present invention also involves utilizing a low-temperature source present in the pump system, and using this low-temperature source for heat exchange with the fluid flowing to the pump, thereby lowering the temperature of the incoming fluid and reducing the occurrence of cavitation. In the case of a liquid rocket engine, a coolant or another propellant whose temperature is lower than that of the primary propellant can be employed as this low-temperature source.

DESCRIPTION OF THE PREFERRED EMBODIMENTS

An example of application to a liquid rocket engine will be given as an embodiment of the pump system pertaining to the present invention, and will be described below through reference to the drawings.

Liquid oxygen and liquid hydrogen, which has an even lower temperature than liquid oxygen, are commonly used as coolants for cooling, or as propellants that serve as fuel, in liquid rocket engines. In this embodiment, liquid hydrogen having a lower temperature than liquid oxygen is utilized as the low-temperature source in this liquid rocket engine to lower the temperature of the liquid oxygen at the liquid oxygen pump inlet, reduce the saturated vapor pressure of the liquid oxygen, and prevent the occurrence of cavitation.

Figure 1:
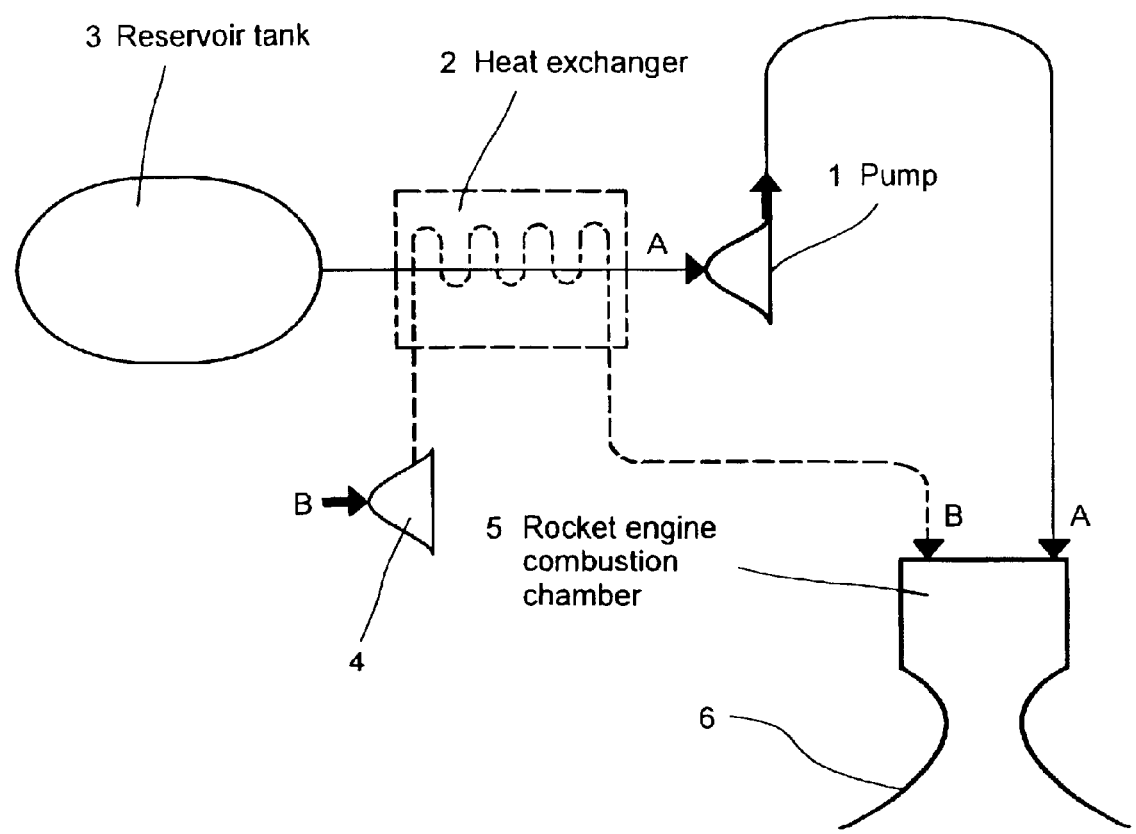
FIG. 1 is a concept diagram illustrating the constitution of an embodiment in which the pump system pertaining to the present invention is applied to the propellant supply system of a liquid rocket engine.

FIG. 1 is a concept diagram illustrating the constitution of an embodiment in which the pump system pertaining to the present invention is applied to the propellant supply system of a liquid rocket engine.

In this drawing, numeral A is a propellant and numeral B is another propellant that serves as the low-temperature source. With this system, the temperature of the propellant B is lower than the temperature of the propellant A, so the propellant B is utilized as the low-temperature source for cooling the propellant A. For example, in this case the propellant A is liquid oxygen and the propellant B is liquid hydrogen, as discussed above. Numeral 1 is a pump for the propellant A, numeral 2 is a heat exchanger, and numeral 3 is a tank for storing the propellant A. Numeral 4 is a pump for the propellant B serving as the low-temperature source, and supplies the propellant B from a propellant B tank (not shown). Numeral 5 is a rocket engine combustion chamber, and numeral 6 is a rocket engine nozzle.

The propellant B is pumped to the heat exchanger 2 by the pump 4, after which it is sprayed into the rocket engine combustion chamber 5. The propellant A contained in the tank 3 undergoes heat exchange with the propellant B serving as the low-temperature source in the heat exchanger immediately before flowing into the pump 1, and this lowers the fluid temperature. Because the fluid velocity of the propellant A is low at the time of this inflow, there is only slight pressure loss inside the heat exchanger 2, and the temperature decrease resulting from heat exchange is more than beneficial enough to compensate for the decrease in pressure due to this pressure loss. As a result, as will be described below, cavitation is reduced within the pump 1. The propellants A and B are then supplied to the rocket engine combustion chamber 5.

Figure 2:
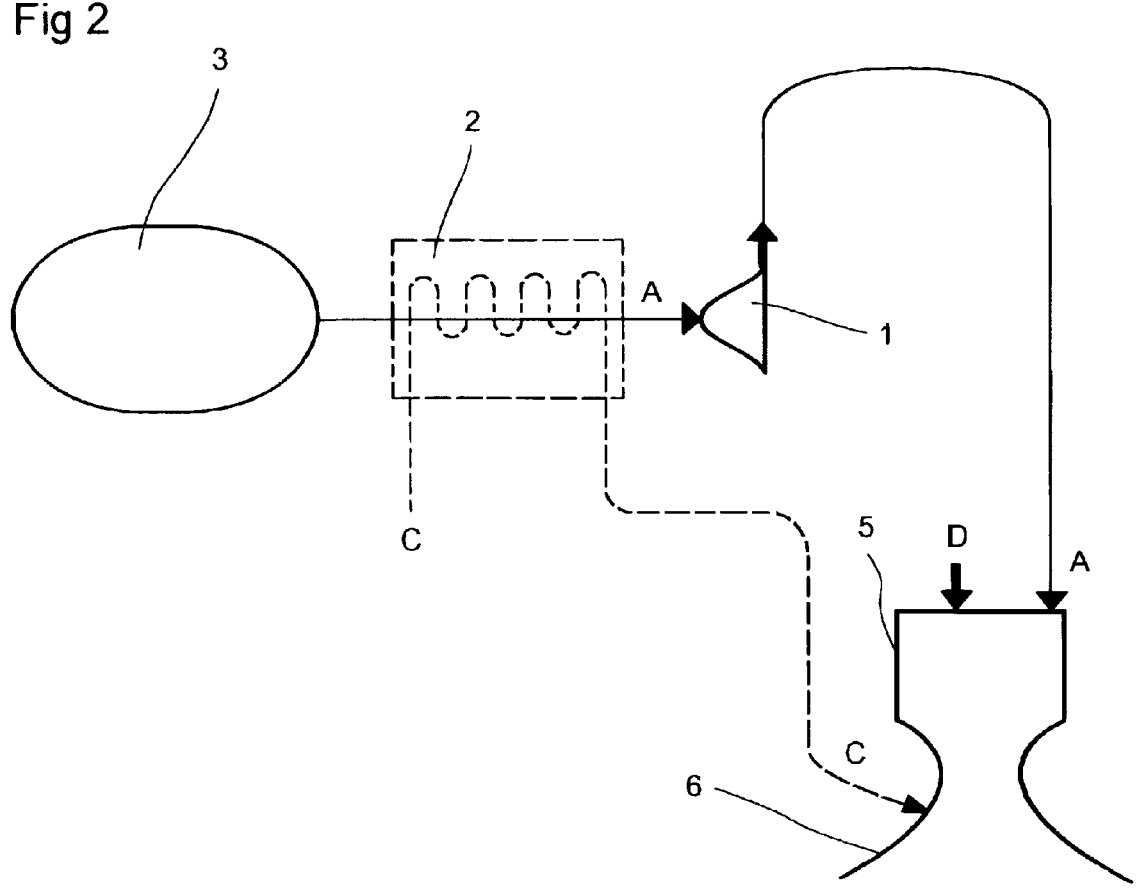
FIG. 2 is a concept diagram illustrating the constitution of another embodiment in which the pump system pertaining to the present invention is applied to the propellant supply system of a liquid rocket engine.

FIG. 2 is a concept diagram illustrating the constitution of another embodiment in which the pump system pertaining to the present invention is applied to the propellant supply system of a liquid rocket engine. Only the differences from the above embodiment will be described.

In this embodiment, numeral A is a propellant, numeral C is a coolant that serves as a low-temperature source for cooling the engine nozzle, and numeral D is a propellant other than the propellant A. With this system, a fluid with a lower temperature than the propellant A is used as the coolant C, and this is utilized as the low-temperature source to cool the propellant A. For example, when the propellant A is liquid oxygen, the coolant C is liquid hydrogen, which has a lower temperature than liquid oxygen. When the propellant A is liquid hydrogen, the coolant C is slush hydrogen, for example, which has a lower temperature than liquid hydrogen.

In the above embodiment, the described structure prevented the occurrence of cavitation in the pump for the propellant A, but it should go without saying that with a rocket engine of the type that burns a plurality of propellants as in this embodiment, cavitation can also be reduced in the pump (not shown) for the other propellant D by lowering the temperature of the propellant D with the coolant C, just with the propellant A. For instance, when the propellant D is liquefied methane, the temperature of the propellant D can be lowered by using liquid hydrogen as the coolant C.

Figure 3:
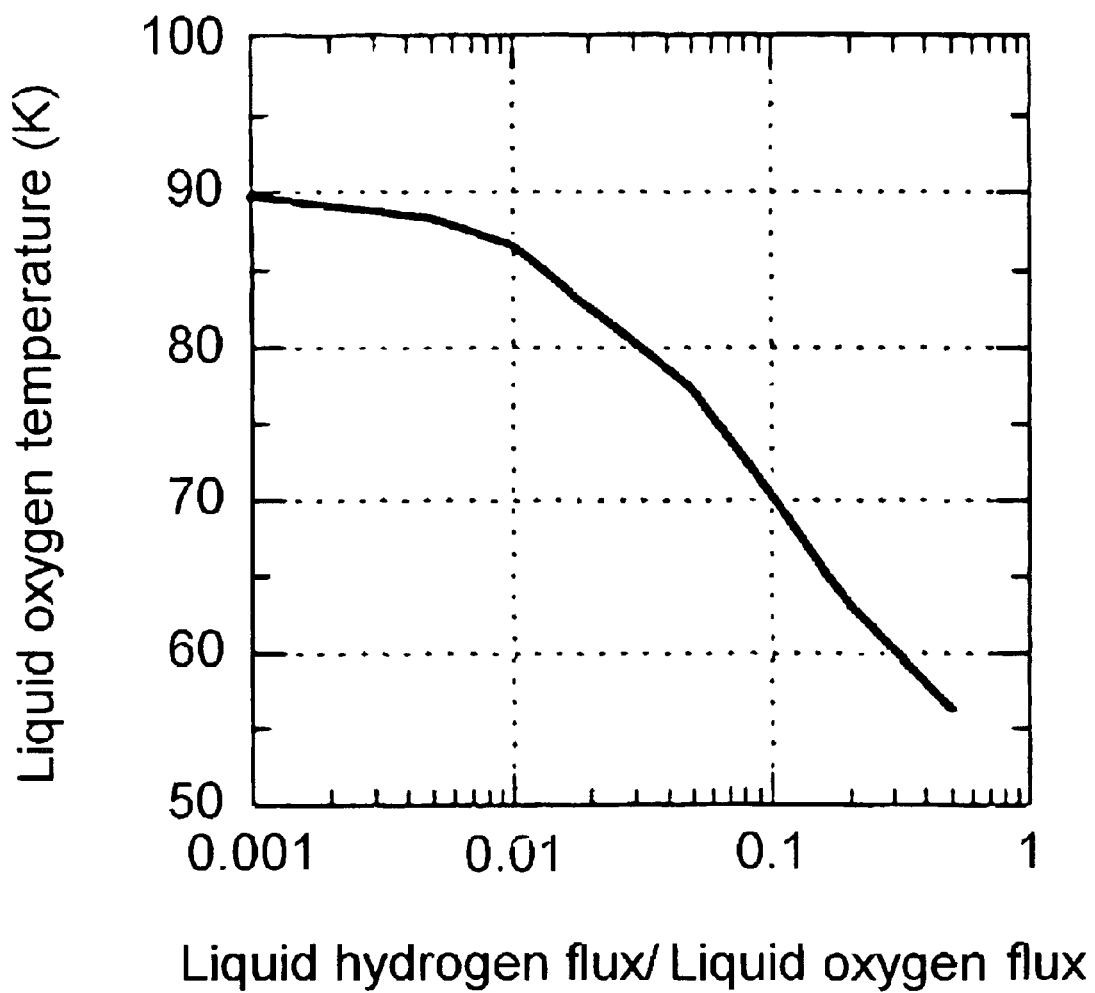
FIG. 3 is a graph of liquid oxygen temperature versus hydrogen/oxygen flux ratio when liquid hydrogen is used to lower the liquid oxygen temperature.

FIG. 3 is a graph of liquid oxygen temperature versus hydrogen/oxygen flux ratio when liquid hydrogen is used to lower the liquid oxygen temperature through heat exchange in the embodiment shown in FIG. 1.

The vertical axis is the liquid oxygen temperature (K) after heat exchange, while the horizontal axis is the ratio between the liquid hydrogen flux and the liquid oxygen flux. Here, the liquid oxygen prior to heat exchange has a temperature of 90K and a pressure of 400 kPa, while the liquid hydrogen prior to heat exchange has a temperature of 50K and a pressure of 10 MPa. The temperatures of the two fluids are equal after heat exchange. As a result, in a typical case in which the propellant flux ratio (liquid hydrogen flux/liquid oxygen flux) in a liquid hydrogen-liquid oxygen rocket is 0.16, it can be seen that the liquid oxygen temperature after heat exchange decreases to about 65K.

Figure 4:
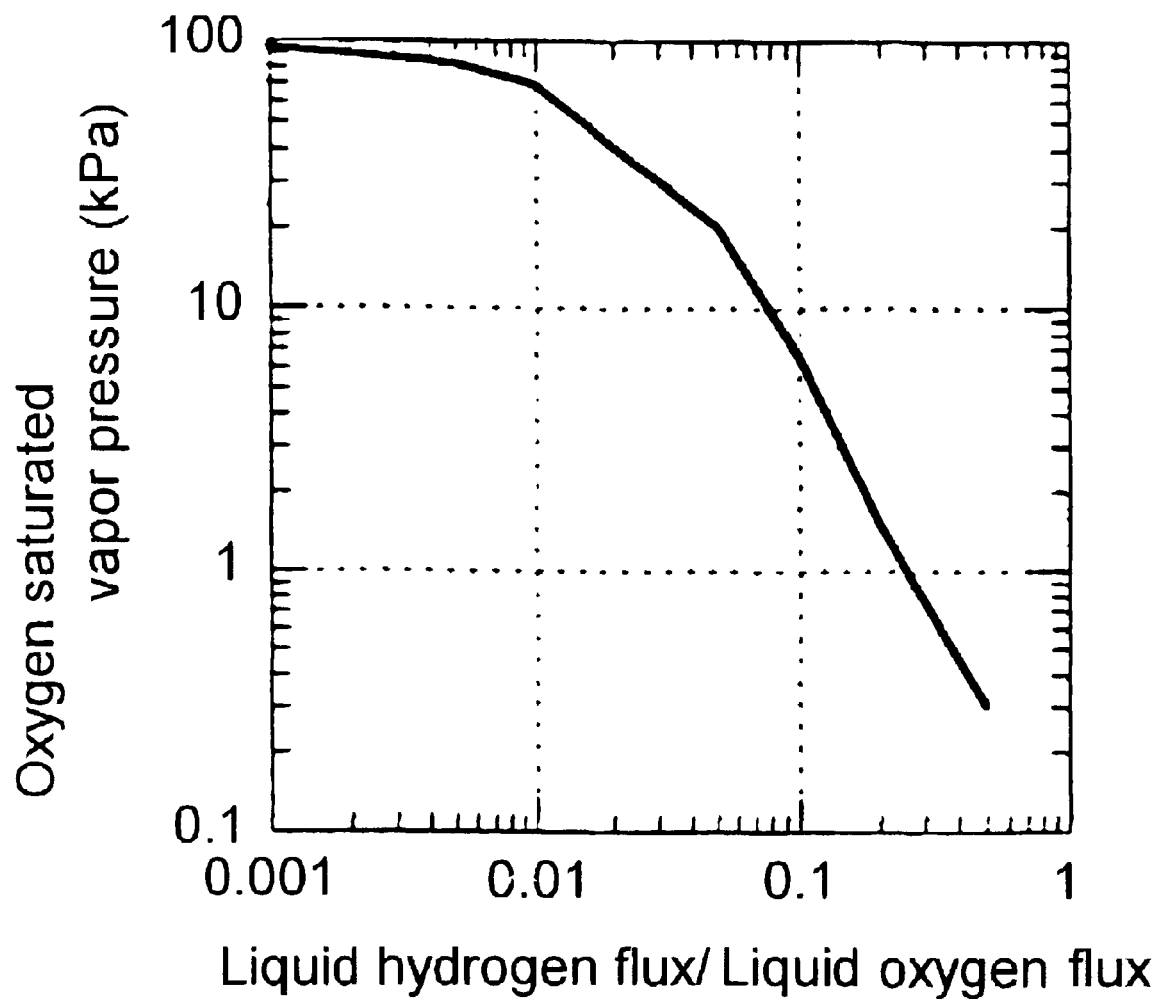
FIG. 4 is a graph of the saturated vapor pressure of liquid oxygen when the temperature decrease shown in FIG. 3 is obtained.

FIG. 4 is a graph of the saturated vapor pressure of liquid oxygen when the temperature decrease shown in FIG. 3 is obtained.

The vertical axis is the saturated vapor pressure (kPa) of the liquid oxygen after heat exchange, while the horizontal axis is the ratio between the liquid hydrogen flux and the liquid oxygen flux. As shown in the drawing, the saturated vapor pressure of the liquid oxygen is greatly lowered by heat exchange, making it much less likely that cavitation will occur.

In general, the value obtained by subtracting the saturated vapor pressure from the inlet pressure and expressing this pressure as the height of a water column is termed the Net Positive Suction Head (NPSH), expressed by the following equation.

*NPSH*=(pump inlet pressure−saturated vapor pressure)/fluid density at pump inlet/gravitational acceleration This value represents the margin up to the evaporation point of a fluid, and the larger is this value, the greater is the margin before cavitation occurs.

Figure 5:
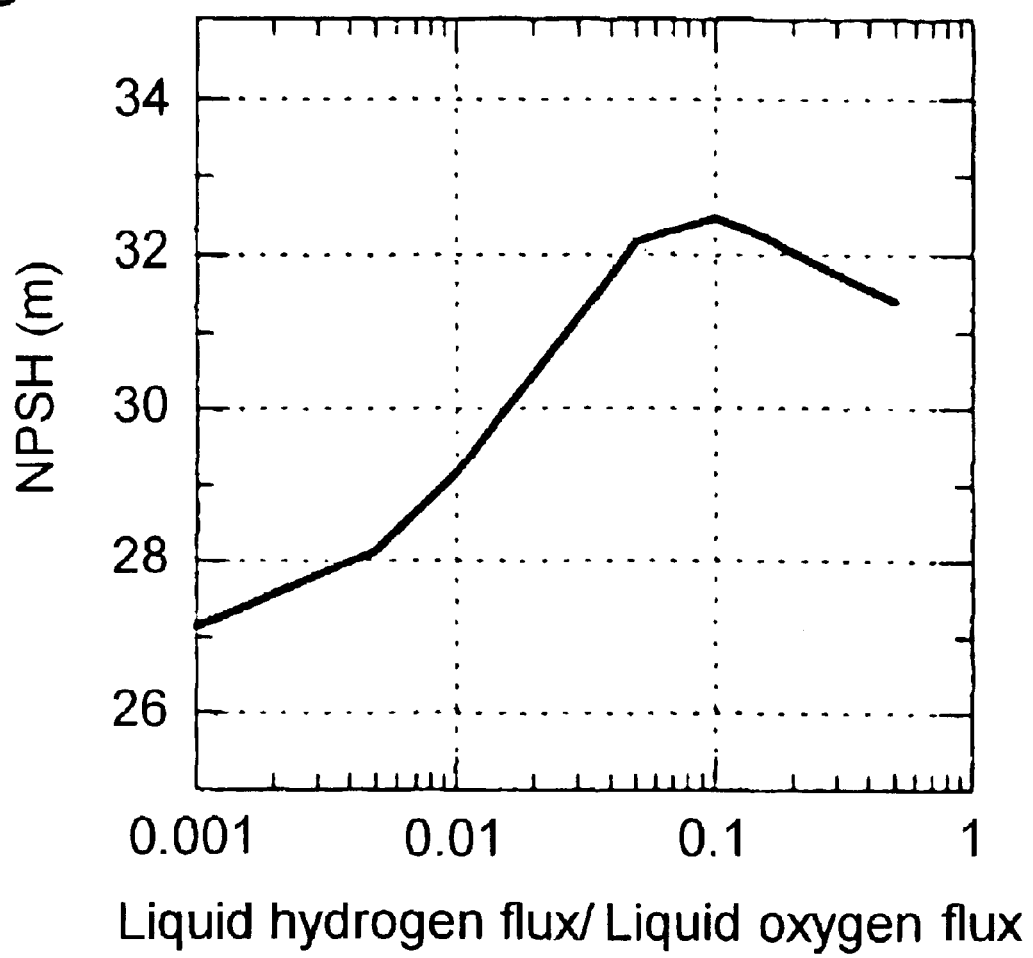
FIG. 5 is a graph of the Net Positive Suction Head when the liquid oxygen temperature is decreased as shown in FIG. 3.

FIG. 5 is a graph of the NPSH when the liquid oxygen temperature is decreased as shown in FIG. 3.

The vertical axis is the NPSH (m) of the liquid oxygen after heat exchange, and the horizontal axis is the liquid hydrogen flux/liquid oxygen flux. As shown by this graph, when no heat exchanger is used as in the past, this NPSH is 27 m. In contrast, with the embodiment of the present invention, under conditions in which the propellant flux ratio (hydrogen flux/oxygen flux) is 0.16, the NPSH is 32.2 m, which means that an improvement of about 20% in the suction performance can be anticipated.

Meanwhile, if the NPSH is the same 27 m as when no heat exchange is performed, the required pump inlet pressure under conditions in which the propellant flux ratio (hydrogen flux/oxygen flux) is 0.16 decreases to approximately 300 kPa in a state in which the liquid oxygen temperature has been lowered to 65K by heat exchange.

Specifically, it can be seen that the pump system pertaining to the present invention lowers the pressure inside the propellant tank by lowering the pump inlet temperature. As a result, the walls of the propellant can be made thinner, which makes the tank more lightweight.

Also, as can be seen from the above equation expressing the NPSH, the smaller is the NPSH of a pump in a state in which no heat exchange is performed, that is, the smaller is the difference between the initial pump inlet pressure and the saturated vapor pressure, the greater will be the effect of lowering the saturated vapor pressure at the pump inlet.

As discussed above, the occurrence of cavitation is reduced with the present invention, which allows the propellant tank pressure to be decreased, and this means that the propellant tank can have thinner walls and be more lightweight, and this increases the weight that the rocket engine is capable of launching.

Also, reducing the occurrence of cavitation makes it possible to raise the pump speed, and leads to reductions in pump size and weight.

Furthermore, raising the pump speed increases the attainable pump pressure, allows the rocket engine operating pressure to be higher, and allows the overall size and weight of the engine to be reduced.

Also, raising the rocket engine operating pressure increases the pressure level inside the nozzle downstream from the combustion chamber, allowing the combustion gas to expand to a larger outlet surface area, boosting the specific thrust, and even leading to a reduction in fuel consumption.

What is claimed is:

1. A system reducing pump cavitation in a rocket pump system comprising:

a reservoir tank as a first fluid source operative to store a first fluid, said first fluid being a liquid;

a heat exchanger;

a rotary pump as a first pump;

a first fluid path operative to enable passage of only said first fluid from said first fluid source through said heat exchanger to said first pump;

a second fluid source operative to supply a second fluid which has a lower temperature than said first fluid;

a second pump, and a second fluid path operative to enable passage of said second fluid from said second fluid source through said second pump to said heat exchanger;

wherein said heat exchanger is operative to enable heat transfer from said first fluid to said second fluid and lowering the temperature of said first fluid at the inlet of said first pump for reducing pump cavitation in said first pump, and wherein said first and second fluids are liquid rocket engine propellants.

2. The system of claim 1, wherein said first fluid has a lower temperature in said first pump than in said reservoir tank.

3. The system of claim 2, wherein said first fluid is a liquid rocket engine propellant.

4. The system of claim 1, wherein said second fluid is also a liquid rocket engine coolant.

5. A method reducing pump cavitation in a rocket pump system having a rotary pump, said method comprising:

directing a first fluid from a first fluid source through a heat exchanger to a first pump, said first fluid being a liquid, said first fluid source being a reservoir tank, and said first pump being said rotary pump, wherein only said first fluid is directed to said first pump;

directing a second fluid from a second fluid source to said heat exchanger, wherein said second fluid has a lower temperature than said first fluid;

transferring heat from said first fluid to said second fluid and cooling the first fluid by said second fluid; and wherein said second fluid is utilized as a low-temperature source to lower the temperature of said first fluid at the inlet of said first pump to reduce the saturated vapor pressure of said first fluid and to prevent the occurrence of cavitation in said first pump, and wherein said first and second fluids are liquid rocket engine propellants.

6. The system of claim 5, wherein said first fluid has a lower temperature in said first pump than in said reservoir tank.

7. The system of claim 6, wherein said first fluid is a liquid rocket engine propellant.

8. The system of claim 5, wherein said second fluid is also a liquid rocket engine coolant.

* * * * *